(12) United States Patent
Hagelqvist et al.

(10) Patent No.: US 9,546,009 B2
(45) Date of Patent: Jan. 17, 2017

(54) APPARATUS AND METHOD FOR SEALING A CARDBOARD-BASED CONTAINER

(75) Inventors: Per Hagelqvist, Lund (SE); Lennart Larsson, Malmö (SE)

(73) Assignee: A&R CARTON LUND AB, Lund (SE)

( * ) Notice: Subject to any disclaimer, the term of this patent is extended or adjusted under 35 U.S.C. 154(b) by 583 days.

(21) Appl. No.: 14/232,166

(22) PCT Filed: Jul. 11, 2011

(86) PCT No.: PCT/SE2011/050939
§ 371 (c)(1),
(2), (4) Date: Apr. 4, 2014

(87) PCT Pub. No.: WO2013/009226
PCT Pub. Date: Jan. 17, 2013

(65) Prior Publication Data
US 2014/0215973 A1 Aug. 7, 2014

(51) Int. Cl.
*B65B 7/28* (2006.01)
*B65B 51/22* (2006.01)
(Continued)

(52) U.S. Cl.
CPC ............. *B65B 7/2878* (2013.01); *B65B 31/02* (2013.01); *B65B 31/028* (2013.01);
(Continued)

(58) Field of Classification Search
CPC ...... B65B 7/2807; B65B 7/2878; B65B 35/36; B65B 35/44; B65B 51/227; B65G 25/04; B65G 33/06; B65G 47/31; B65G 2201/0235; B65G 2811/0631
(Continued)

(56) References Cited

U.S. PATENT DOCUMENTS 1,649,459 A * 11/1927 Fullips ...................... B67B 1/10
53/299
2,180,954 A * 11/1939 Harrison ................. B65B 57/00
53/310
(Continued)

FOREIGN PATENT DOCUMENTS

DE 2020470 A1 * 11/1971 ............. B65B 35/36
EP 0559290 A1 * 9/1993 ........... B65B 7/2878
(Continued)

OTHER PUBLICATIONS

Office Action for Japanese Application No. 2014-520161, Mailed Aug. 10, 2015.
(Continued)

*Primary Examiner* — Stephen F Gerrity
(74) *Attorney, Agent, or Firm* — Brinks Gilson & Lione

(57) ABSTRACT

An apparatus and method for sealing an open end of a cardboard-based container containing a powder. A transporter is configured to transport a flow of containers to and from an inductive welding unit. The transporter includes a feeding arrangement to separate the containers and a main conveyor member to convey the spaced containers. A movable gripping arrangement is configured to simultaneously grip at least two containers and simultaneously transfer these containers from the main conveyor member to the welding unit. The welding unit is configured to simultaneously fasten a lid to each of the simultaneously transferred containers.

20 Claims, 14 Drawing Sheets

(51) Int. Cl.
*B65G 47/31* (2006.01)
*B65G 25/04* (2006.01)
*B65G 33/06* (2006.01)
*B65B 31/02* (2006.01)

(52) U.S. Cl.
CPC .......... *B65B 51/227* (2013.01); *B65B 7/2807* (2013.01); *B65G 25/04* (2013.01); *B65G 33/06* (2013.01); *B65G 47/31* (2013.01); *B65G 2201/0235* (2013.01); *B65G 2811/0631* (2013.01)

(58) Field of Classification Search
USPC ........... 53/478, 299, 310–312, 329.2, DIG. 2
See application file for complete search history.

(56) References Cited

U.S. PATENT DOCUMENTS

| | | | | |
|---|---|---|---|---|
| 2,402,508 | A * | 6/1946 | Strickland, Jr. | H05B 6/362 219/647 |
| 2,440,085 | A * | 4/1948 | Glocker | B67B 3/10 53/310 |
| 2,890,787 | A | 6/1959 | Carter | |
| 3,454,142 | A * | 7/1969 | Holstein | B65G 19/245 198/626.1 |
| 3,508,380 | A * | 4/1970 | Nakamura | B65B 7/2885 53/329.2 |
| 3,529,708 | A * | 9/1970 | Dybala | B65B 35/36 198/433 |
| 3,720,038 | A * | 3/1973 | Bryan, Jr. | B65B 7/164 53/478 |
| 3,841,468 | A * | 10/1974 | Eggert | B65G 25/02 198/621.1 |
| 4,095,390 | A * | 6/1978 | Knudsen | B65B 51/227 53/329.4 |
| 4,198,901 | A * | 4/1980 | Knudsen | B31B 1/02 53/314 |
| 4,230,923 | A | 10/1980 | Jeppsson | |
| 4,816,110 | A * | 3/1989 | Foldesi et al. | B65B 7/2878 53/DIG. 2 |
| 4,974,392 | A * | 12/1990 | Mondini | B65B 7/164 53/329 |
| 5,447,007 | A * | 9/1995 | Reil et al. | B65B 55/027 53/299 |
| 5,475,965 | A * | 12/1995 | Mondini | B65B 7/164 53/329.3 |
| 2005/0161306 | A1* | 7/2005 | Lees et al. | B65B 61/186 198/474.1 |
| 2005/0274092 | A1* | 12/2005 | Rohret et al. | B65B 7/2878 53/478 |
| 2010/0107568 | A1* | 5/2010 | Inaba et al. | B65B 7/2878 53/478 |
| 2011/0072764 | A1* | 3/2011 | Daniek et al. | B65B 7/2878 53/556 |

FOREIGN PATENT DOCUMENTS

| | | |
|---|---|---|
| EP | 1260469 A1 | 11/2002 |
| GB | 1564895 | 4/1980 |
| JP | S548134 A | 1/1979 |
| JP | S60501299 A | 8/1985 |
| JP | H01108225 A | 4/1989 |
| JP | H0345806 U | 4/1991 |
| JP | 2008094472 | 4/2008 |
| JP | 2009102036 | 5/2009 |
| WO | 8404486 | 11/1984 |

OTHER PUBLICATIONS

International Search Report for PCT:SE2011:050939, mailed May 16, 2012, 11 pages.
Written Opinion for PCT:SE2011:050939, mailed May 16, 2012, 16 pages.

* cited by examiner

APPARATUS AND METHOD FOR SEALING A CARDBOARD-BASED CONTAINER

RELATED APPLICATIONS

This application claims the benefit under 35 U.S.C. § 371 of International Patent Application No. PCT/SE2011/050939, having an international filing date of Jul. 11, 2011, the contents of which are incorporated herein by reference in its entirety.

TECHNICAL FIELD

This invention relates to an apparatus and method for sealing an open end of a cardboard based container containing a powder. In particular, the invention relates to an apparatus and method where a lid is fastened to the container by inductive heating for melting of a weldable layer that forms part of the container and/or the lid.

BACKGROUND OF THE INVENTION

Equipment for sealing a cardboard based container containing, for instance, a heat sensitive food product powder is known from e.g. EP0074343. Such equipment normally includes a welding unit where a lid is applied to the container in a gas-tight manner by inducing welding energy and melting a weldable, plastic layer that forms part of the container and/or the lid. Such a welded joint is well known to be capable of being gas tight.

Often both the container and the lid form multilayer structures where cardboard forms a supporting layer and where a weldable layer made of a plastic film is applied to the inside of the lid and container. In particular for food products, the layer structure usually includes an aluminium foil arranged between the cardboard and the plastic layer. Typically, a high frequency current energy is induced in the aluminium layer, which foil thereby gets heated and in turn melts the plastic film. Automated equipment of this type further comprises transporting means configured to transport a flow of containers to and from the welding unit.

Equipment for manufacturing of the container, for filling the containers and for applying an additional, outer lid is usually arranged in connection to the sealing equipment.

An important issue in this context is the production rate, i.e. the number of containers per, say, minute that can be supplied with a lid. To be commercially successful, the apparatus used for applying the lids must allow for a high production rate.

A problem when trying to increase the production rate of conventional equipment is that the weldable layer does not get sufficient time to heat up, cool and harden before the containers are removed and transported away from the welding unit. This often results in a damaged and leaking joint. Various heating and cooling devices, as well as different weldable material, have been proposed for carrying out the welding step more quickly but their performance has not been satisfactory.

Thus, there is still a need for equipment of the above mentioned type that allow for a higher production rate.

SUMMARY OF THE INVENTION

An object of this invention is to provide an apparatus and method for sealing an open end of a cardboard-based container containing a powder, which apparatus and method provides for a higher production rate compared to conventional equipment. This object is achieved by the apparatus and method defined below.

The invention concerns an apparatus for sealing an open end of a cardboard based container containing a powder, wherein the apparatus comprises: a welding unit configured to fasten a lid to the container, said welding unit comprising an inductive welding energy generator for melting of a weldable layer that forms part of the container and/or the lid; and transporting means configured to transport a flow of containers to and from the welding unit.

The invention is characterized in that the transporting means comprises, in a container flow order, a feeding arrangement, a main conveyor member and a movable gripping arrangement, wherein the feeding arrangement is configured to transfer containers one by one in a continuous manner to the main conveyor member, wherein the gripping arrangement is configured to transfer containers from the main conveyor member to the welding unit, and wherein the apparatus is arranged in such a way that, during normal operation of the apparatus, the containers line up close to each other at an upstream side of the feeding arrangement, wherein the feeding arrangement is configured to, during operation, separate adjacent containers from each other in the direction of transport by increasing the feeding speed of each individual container along the feeding arrangement and thereby increasing the distance between adjacent containers fed along the feeding arrangement, wherein the main conveyor member is configured to operate at a transport speed that approximately corresponds to, and is uniform in relation to, a discharge speed of the containers when fed out from the feeding arrangement such that containers transferred to and along the main conveyor member remain separated, wherein the moveable gripping arrangement is configured to grip at least two containers and transfer these containers simultaneously from the main conveyor member to the welding unit, and wherein the welding unit is configured to simultaneously fasten a gas-tight lid to each of the simultaneously transferred containers.

Thus, the feeding arrangement creates distances between containers that are fed continuously side-by-side in a row to the feeding arrangement of the apparatus, and the main conveyor member retains the containers spaced in the transport direction by having a transport speed that approximately corresponds to the outlet feeding speed (discharge speed) of the feeding arrangement and that is uniform in relation to the outlet feeding speed of the feeding arrangement. Accordingly, the two speeds are roughly the same so that the container spacing distances do not change, or changes only slightly, when the containers have been transferred to the main conveyor member.

Further, the relation between the two speeds is uniform so that the container spacing distance remains constant. For instance, if one of the speeds is decreased the other speed is decreased in a corresponding manner. This is important for the relative positioning of the containers which in turn is important for allowing easy and secure gripping of two or more containers simultaneously.

The exact distance between the containers is mainly defined by the configuration of the feeding arrangement but can be modified using the main conveyor member. For instance, the feeding speed of the main conveyor member can be adjusted in relation to the outlet feeding speed of the feeding arrangement so as to slightly decrease or further increase the spacing distance. By properly adjusting the feeding arrangement and the main conveyor member an exact distance between the containers can be defined.

Creation of the distance between the containers makes it possible to use a moveable gripping arrangement for gripping and moving a plurality of containers simultaneously from the main conveyor member to the welding unit. In conventional apparatuses of this type it is difficult or impossible to make use of gripping arrangements since the containers line up side-by-side with no space for an automatic gripping member to get hold of an individual container.

Preferably, the container distance chosen should be suitable also for the welding unit so that this distance does not have to be adjusted. In this way the whole gripping arrangement can simply be moved to the welding unit. This allows for a simpler design of the gripping arrangement and of the apparatus as a whole.

The overall effect of the inventive apparatus is that it allows simultaneous (intermittent) handling—gripping, transferring and welding—of at least two containers which in turn allows time to be spent on the relatively time consuming production step of welding and cooling. In turn, a higher production rate can be used without reducing the quality of the welded joints.

If, for instance, the feeding rate of containers through the apparatus is 120 containers per minute (120-pace), which is a desired rate in many commercial applications, a rough calculation yields that only 0.5 s can be spent on each process step in a conventional continuous apparatus. By handling two containers simultaneously this process time can be doubled to 1 s. A process time of around 2 s for welding and cooling (and transport) has shown to be suitable for containers of certain size and certain material. Consequently, in such applications the preferred number of containers that are to be handled simultaneously is four. More generally, the preferred number of containers to be handled simultaneously is 2-6.

A further effect of the inventive apparatus is that the transportation speed of the containers can be reduced during the intermittent handling. This means that also the acceleration and deceleration forces can be reduced.

A further effect is that the intermittent handling of the containers during the welding step dispenses with the need for moving the containers during this process step, which is complicated but would in many cases be required to reach a high production rate in a regular continuous process.

In an advantageous embodiment of the invention the feeding arrangement comprises a feed screw member provided with an increasing pitch such that the feeding speed of each individual container, as well as the distance between adjacent containers, increase in correspondence with the increasing pitch when containers are transported by the feed screw member. Such a feed screw member creates defined distances between the containers which allow for a controlled positioning and proper gripping of the containers.

Moreover, such a feed screw member allows for a continuous feeding speed at the inlet of the screw member. By adjusting this inlet speed in relation to the speed at which the containers are transported towards the feed screw member, for instance by letting the inlet speed be only slightly lower than the transport speed of a conveyor belt arranged to transport the containers to the feed screw member, it can be prevented that open containers filled with powder bump hard into a non-moving line of containers, which often results in that powder fly off from the container and contaminates the equipment. Instead of bumping into a non-moving line, the open containers will more smoothly approach a continuously moving line of containers.

Further, such a feed screw member is capable of handling both a line of containers (build back) as well as individual containers approaching the feed screw member randomly.

In an advantageous embodiment of the invention the feed screw arrangement comprises two feed screw members arranged in parallel along each side of the flow of containers such that each container is transported between the two feed screw members that are arranged to operate in cooperation with each other. This provides for a secure feeding grip of the containers and reduces the risk that a container slips past its space in the feeding screw.

In an advantageous embodiment of the invention the main conveyor member comprises slide guides and carrier bars, wherein the slide guides are configured to support the containers when transferred to the main conveyor member and allow them to slide in the transport direction and wherein the carrier bars are distributed at defined distances from each other along a moving and conveying part of the main conveyor member such as to push the containers along the slide guides. This way the containers are prevented from sliding in relation to a regular moving part, such as conveying band, which would result in an undefined distance between adjacent containers and lead to problems in the gripping process. Using slide guides and carrier bars of the above type improves further the positioning of the containers prior to gripping, i.e. the distance between adjacent containers becomes very well defined.

In an advantageous embodiment of the invention the transporting means comprises an inlet conveyor member configured to feed containers to the feeding arrangement, wherein the inlet conveyor member is configured to operate at a transport speed that approximately corresponds to, and is uniform in relation to, an initial feeding speed at an inlet side of the feeding arrangement. This provides for a smooth transition for the containers between the inlet conveyor member and the feeding arrangement. Preferably, the inlet conveyor member also forms a support for the containers while fed along the feeding arrangement. Preferably, the inlet conveyor member is configured to allow the containers to slide while supported when their feeding speed increases during feeding along the feeding arrangement. The inlet conveyor member may comprise an endless steel band that transports and supports the containers.

In an advantageous embodiment of the invention that the welding unit comprises at least two subunits, each subunit comprising a cavity adapted to receive at least an upper part of the container where the lid is to be fastened, wherein the inductive welding energy generator, such as a coil, extends around the cavity such as to circumferentially surround a container placed in the cavity along a distance corresponding to a side edge of a lid placed in its intended fastening position in the container, each subunit further comprising a lid positioning device configured to position a lid in the intended fastening position.

In an advantageous embodiment of the invention the moveable gripping arrangement comprises a first and a second gripping element arranged to operate on opposite sides of the flow of containers, wherein the gripping elements are moveable towards and away from each other for gripping and releasing the containers, respectively, and wherein the gripping elements, in a synchronized manner, are movable along the flow of containers between the main conveyor member and the welding unit for the simultaneous transfer of containers, each gripping element being provided with at least two recesses for gripping on each side of a corresponding number of simultaneously gripped containers, wherein the distance between the recesses of each gripping element corresponds to the distance between containers positioned on the main conveyor member during operation of the apparatus.

In an advantageous embodiment of the invention the transporting means comprises a second moveable gripping arrangement and a further, outlet conveyor member arranged downstream of the welding unit, wherein the second moveable gripping arrangement is configured to grip the at least two containers and transfer these containers simultaneously from the welding unit to the further conveyor member.

In an advantageous embodiment of the invention a stationary sliding plate is arranged downstream of the further conveyor member such that the containers are transferred to the sliding plate from the second conveyor member. Such a sliding plate decreases the feeding speed of the containers and reduces the distance between them. Thus, the containers will again line up close to each other in a continuous row as at the upstream side of the feeding arrangement.

In an advantageous embodiment of the invention a housing is arranged to surround the apparatus such as to allow sealing to take place in a protection gas atmosphere. This is important when handling e.g. oxygen sensitive powder.

In an advantageous embodiment of the invention a container outlet opening is arranged in the housing downstream of the sliding plate, wherein the size of the opening is adapted to the size of the containers used. Since the sliding plate forms a continuous row of containers, and since the size of the opening is adapted to the size of the containers, the outlet opening becomes relatively gas-tight during operation of the device without any need for additional equipment.

In an advantageous embodiment of the invention the movable gripping arrangement is configured to grip four containers and transfer these four containers simultaneously from the main conveyor member to the welding unit, wherein the welding unit is configured to simultaneously fasten a gas-tight lid to each of the four containers.

The invention also concerns a method for sealing an open end of a cardboard based container containing a powder, comprising the steps of: —fastening, in a welding unit, a lid to the container using an inductive welding energy generator for melting of a weldable layer that forms part of the container and/or the lid; and transporting a flow of containers to and from the welding unit.

The inventive method is characterized in that it comprises the steps of:
  transferring containers one by one in a continuous manner from a feeding arrangement to a main conveyor member,
  transferring containers from the main conveyor member to the welding unit by means of a movable gripping arrangement
  separating adjacent containers from each other in the direction of transport by increasing the feeding speed of each individual container along the feeding arrangement and thereby increasing the distance between adjacent containers fed along the feeding arrangement,
  operating the main conveyor member at a transport speed that approximately corresponds to, and is uniform in relation to, a discharge speed of the containers when fed out from the feeding arrangement such that containers transferred to and along the main conveyor member remain separated,
  gripping, by means of the moveable gripping arrangement, at least two containers and transferring these containers simultaneously from the main conveyor member to the welding unit, and fastening simultaneously a gas-tight lid to each of the simultaneously transferred containers.

BRIEF DESCRIPTION OF DRAWINGS

In the description of the invention given below reference is made to the following figure, in which.

DESCRIPTION OF EXAMPLE EMBODIMENTS OF THE INVENTION

Figure 1:
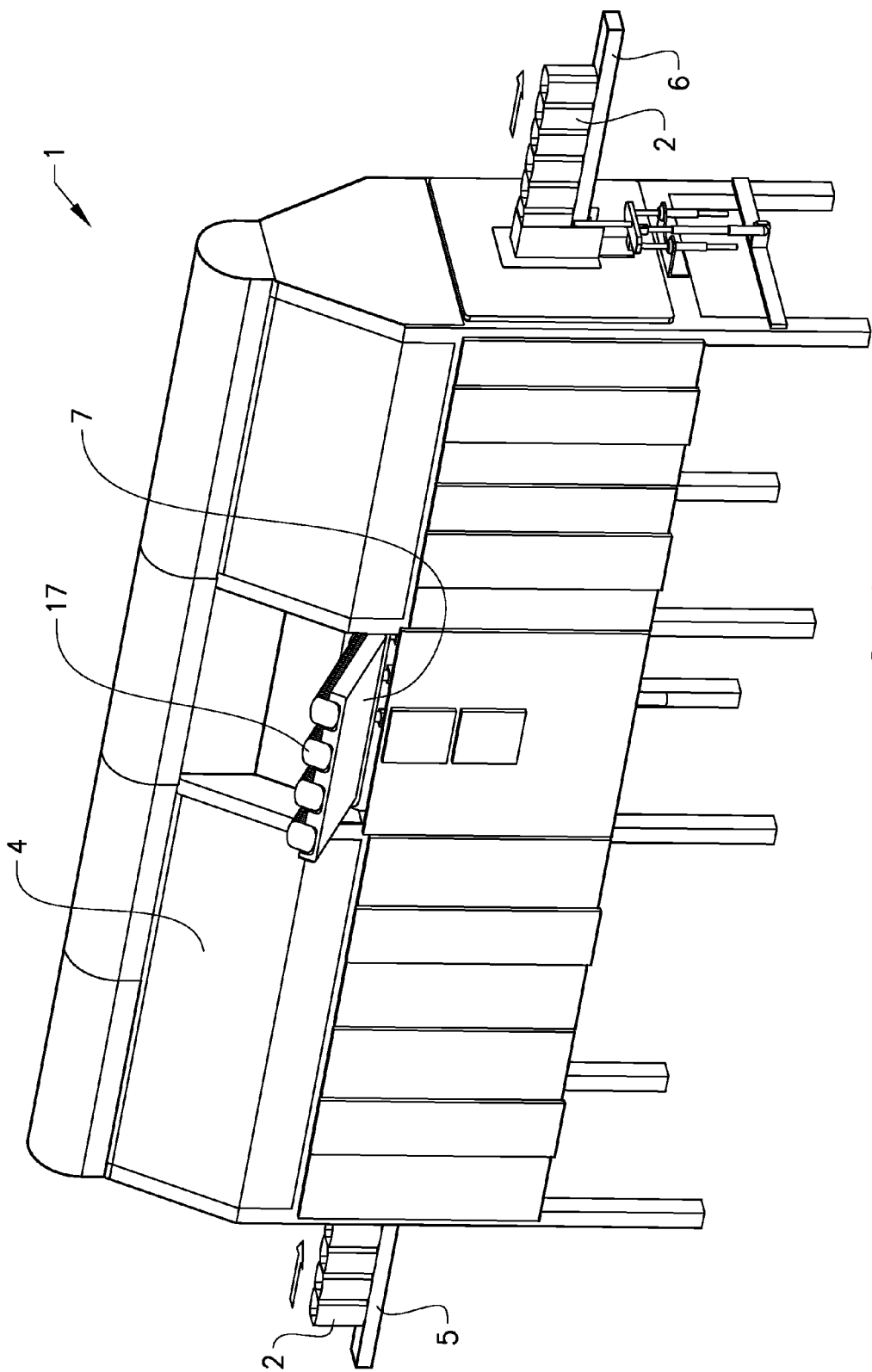
FIG. 1 shows, in a perspective view, a preferred embodiment of an apparatus according to the invention.
Figure 3:
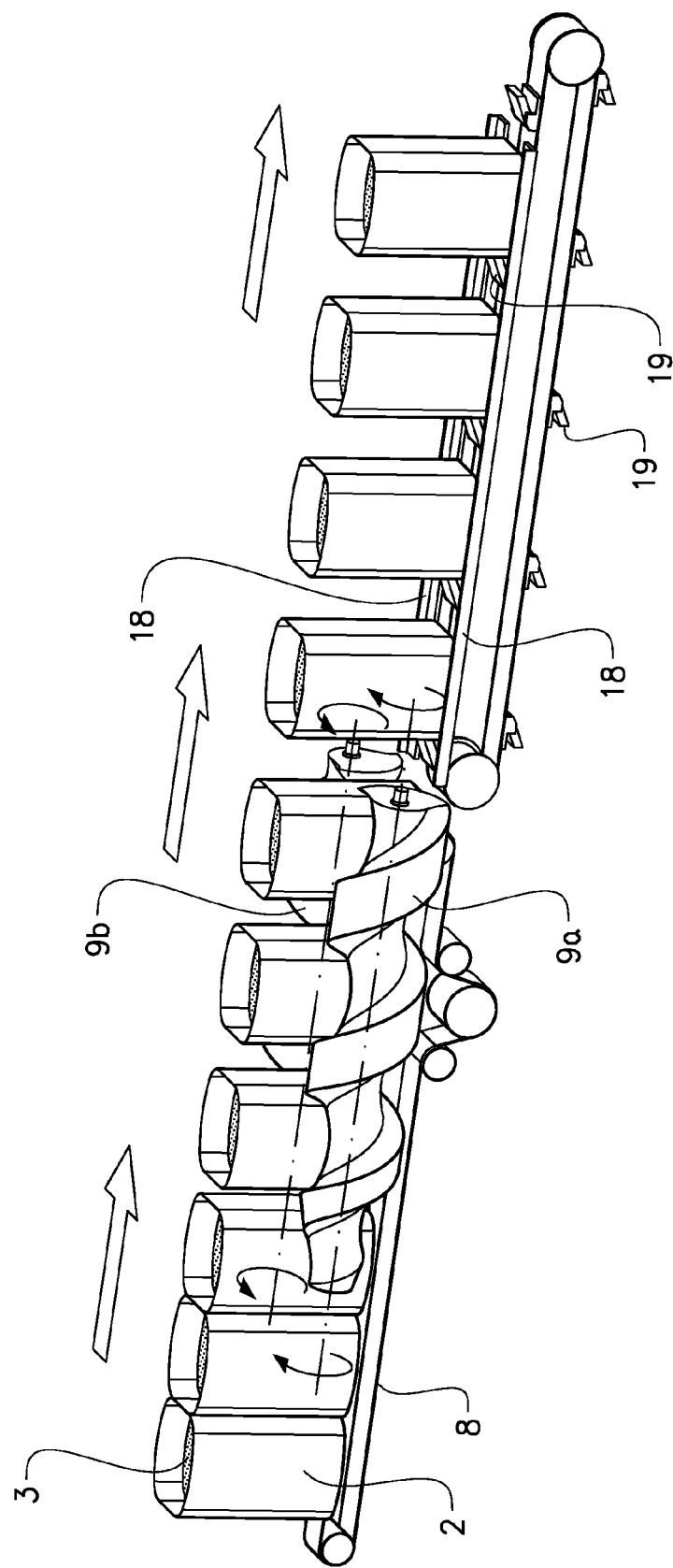
FIG. 3 shows an inlet conveyor member, a feeding arrangement, and a main conveyor member of the apparatus shown in FIG. 1, FIGS. 4A-4D show the function of first and second movable gripping arrangements, parts of a welding unit and a further, outlet conveyor member of the apparatus shown in FIG. 1, FIGS. 5A-5E show the function of the welding unit of the apparatus shown in FIG. 1.

FIG. 1 shows, in a perspective view, a preferred embodiment of an inventive apparatus 1 for sealing an open end of a cardboard based container 2 containing a powder 3 (see FIG. 3). A housing 4 is arranged to surround the apparatus 1 such as to allow sealing to take place in a protection gas atmosphere. A conveyor 5 feeds containers 2 to the apparatus 1 and another conveyor 6 feeds containers 2 away from the apparatus 1. A lid supply unit 7 with lids 17 can be seen in FIG. 1.

Figure 2:
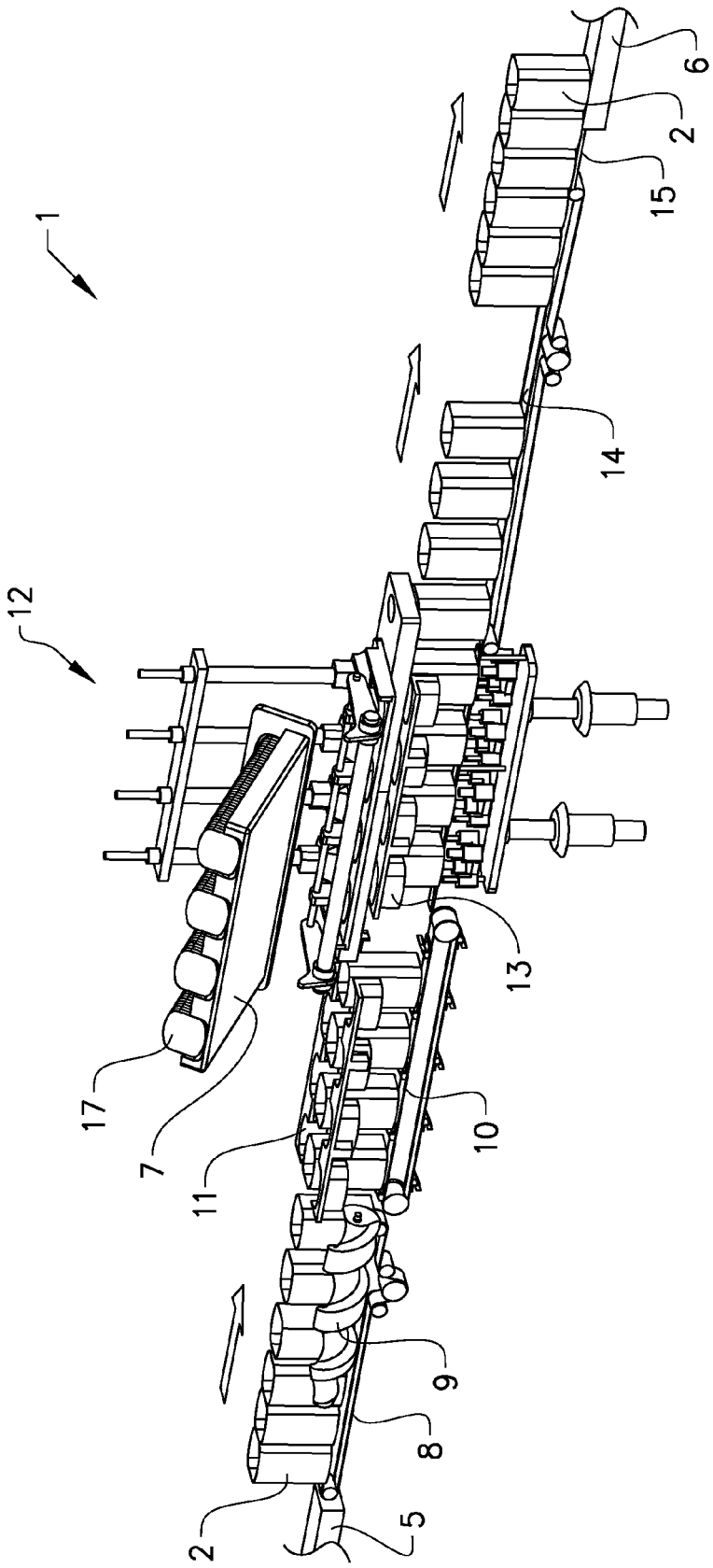
FIG. 2 shows parts of the inside of the apparatus shown in FIG. 1.

FIG. 2 shows parts of the inside of the apparatus 1 shown in FIG. 1. From left to right in FIG. 2, i.e. from inlet side to outlet side of the apparatus 1. it is shown an inlet conveyor member 8, a feeding arrangement 9 in the form of two feed screw (scroll) members 9a, 9b (see FIG. 3), a main conveyor member 10, a first movable gripping arrangement 11, a welding unit 12, a second movable gripping arrangement 13, a further, outlet conveyor member 14 arranged downstream of the welding unit 12 and a stationary sliding plate 15 arranged at the outlet of the apparatus 1.

The welding unit 12 is configured to fasten a lid 17 to each of the containers 2 and comprises an inductive welding energy generator 25 (see FIG. 5E) for melting of a weldable, plastic layer that forms part of the material forming both the container 2 and the lid 17. The feeding arrangement and the various conveyors and moveable gripping arrangements form transporting means configured to transport a flow of containers 2 to and from the welding unit 12, FIG. 3 shows the inlet conveyor member 8, the feeding arrangement 9 in the form of the two feed screw members 9a, 9b, and the main conveyor member 10. The feed screw members 9a, 9b are arranged in parallel along each side of the flow of containers 2. The two feed screw members 9 are arranged to operate in cooperation with each other such that each container 2, one by one, is transported between the two feed screw members 9.

The inlet conveyor member 8 feeds containers 2 to the feeding arrangement 9 and operates at a transport speed that approximately corresponds to, and is uniform in relation to, an initial feeding speed at an inlet side of the feeding arrangement 9. This way the containers 2 neither have to come to a full stop nor have to be vigorously accelerated at this part of the apparatus 1.

The feeding arrangement 9 is configured to transfer containers 2 one by one in a continuous manner to the main conveyor member 10 by rotating the feed screw members continuously. The first movable gripping arrangement 11 is configured to transfer containers 2 from the main conveyor member 10 to the welding unit 12. As can be seen in FIGS. 1-3, the apparatus 1 is arranged in such a way that, during normal operation of the apparatus 1, the containers 2 line up against each other side-by-side in a row at an upstream (inlet) side of the feeding arrangement 9.

The feeding arrangement 9 is configured to, during operation, separate adjacent containers 2 from each other in the direction of transport by increasing the feeding speed of each individual container 2 along the feeding arrangement and thereby increasing the distance between adjacent containers 2 fed along the feeding arrangement 9. In the example described here, each of the two feed screw members 9a, 9b is provided with an increasing pitch such that the feeding speed of each individual container 2 as well as the distance between adjacent containers 2 increase in correspondence with the increasing pitch when containers 2 are transported by the feed screw members 9a, 9b, The main conveyor member 10 is configured to operate at a transport speed that approximately corresponds to, and is uniform in relation to, a discharge speed of the containers 2 when fed out from the feeding arrangement 9 such that containers 2 transferred to and along the main conveyor member 10 remain separated, This can be seen in FIG. 3.

The main conveyor member 10 is provided with stationary slide guides 18 and moving carrier bars 19. The slide guides 18 extend along the main conveyor member 10 and support and guide (vertically and transversally) the containers 2 when transferred to the main conveyor member 10 and allow the containers 2 to slide in a controlled manner in the transport direction. The carrier bars 19 protrude between the slide guides 18 and are distributed at defined distances from each other along a belt or chain that forms the moving and conveying part of the main conveyor member 10. The carrier bars 19 are attached to the moving part.

The distance between adjacent carrier bars 19 corresponds to the distance at which the containers 2 are separated when fed out from the feeding arrangement 9. The carrier bars 19 push the containers 2 along the slide guides 18 and secures that the defined distance between the containers 2 is maintained. Thus, containers 2 placed on the main conveyor member 10 are positioned in a controlled and defined manner in relation to each other. By synchronizing the movements of the main conveyor member 10 and the first moveable gripping member 11, preferably by adapting the movement of the latter to that of the former, a proper gripping can be achieved. The protruding part of each carrier bar 19 is resiliently suspended so that the containers 2 can pass them by pressing them down when moved by the first moveable gripping member 11 in a forward (machine) direction towards the welding unit 12.

FIGS. 4A-4D show the function of the first and the second movable gripping arrangements 11, 13, parts of the welding unit 12 and the further, outlet conveyor member 14. The first moveable gripping arrangement 11 grips four containers 2 simultaneously at the main conveyor member 10 and transfers these containers 2 simultaneously to the welding unit 12 that is configured to simultaneously fasten a lid 17 to each of these four containers 2. The second moveable gripping arrangement 13 and the further, outlet conveyor member 14 are arranged downstream of the welding unit 12, wherein the second moveable gripping arrangement 13 grips the four containers 2 provided with lids 17 and transfer these containers 2 simultaneously from the welding unit 12 to the further conveyor member 14.

Figure 4A:
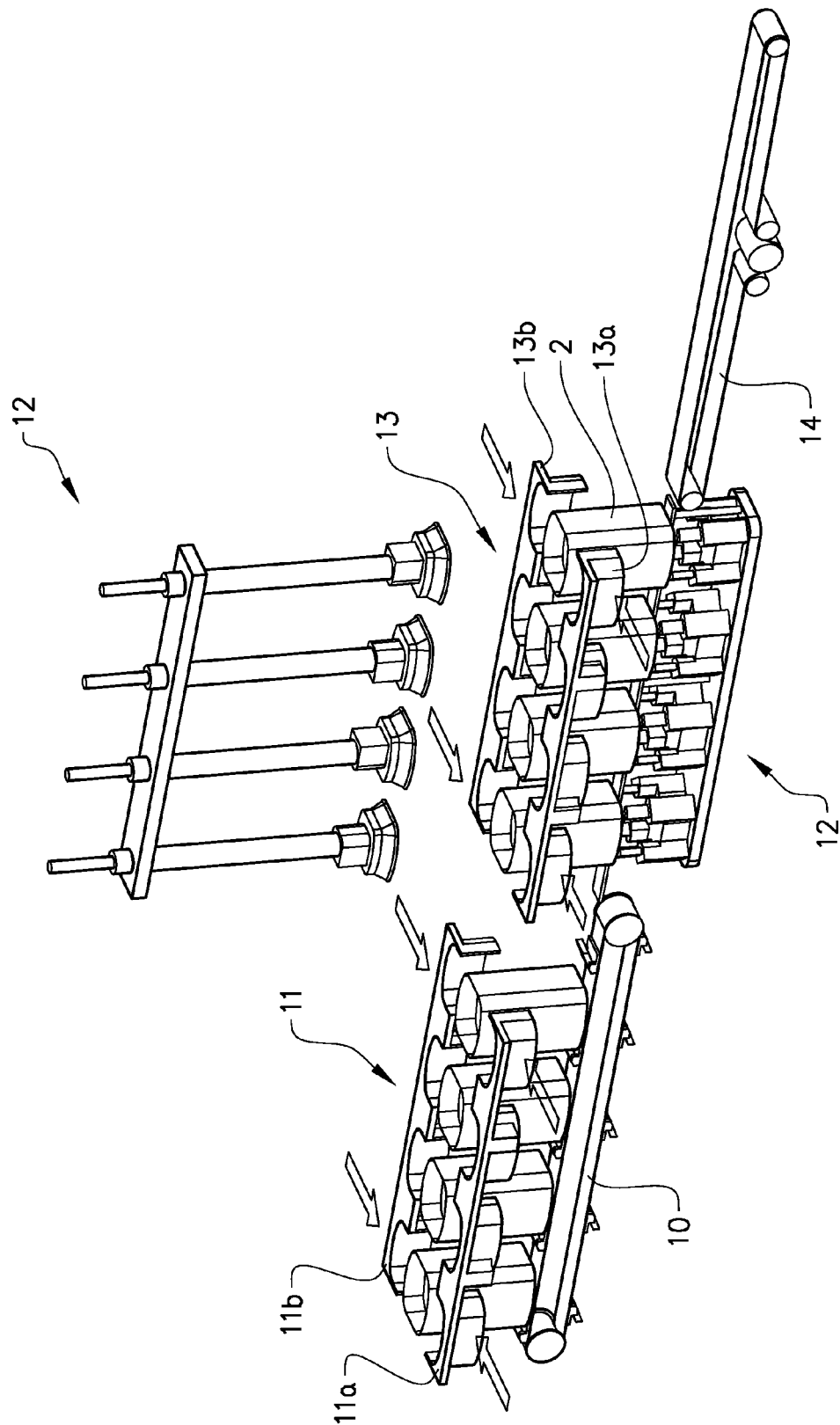

As can be seen in FIGS. 4A-4D, each moveable gripping arrangement 11, 13 comprises a first and a second gripping element 11a-11b, 13a-13b arranged to operate on opposite sides of the flow of containers 2. The corresponding gripping elements 11a-11b, 13a-13b are moveable towards and away from each other for gripping and releasing the containers, respectively. In FIG. 4A the corresponding gripping elements 11a-11b, 13a-13b are positioned at a distance from each other, whereas in FIG. 4B they have been moved together. The corresponding gripping elements 11a-11b, 13a-13b are movable in a synchronized manner along the flow of containers 2 between the main conveyor member 10 and the welding unit 12 (the first moveable gripping arrangement 11) and between the welding unit 12 and the further, outlet conveyor member 14 (the second moveable gripping arrangement 13) for the simultaneous transfer of containers 2. Each gripping element 11a, 11b, 13a, 13b is provided with in this case four recesses 20 (see FIG. 4D) for simultaneous gripping on each side of four containers 2. The distance between the recesses 20 of each gripping element 11a, 11b, 13a, 13b corresponds to the distance between containers 2 positioned on the main conveyor member 10 during operation of the apparatus 1. Arrangements for allowing and controlling the movement of the gripping members and elements can be designed in different ways and this is not described here.

In FIG. 4A a first set of four containers has been provided with lids and is placed in the welding unit 12. A second set of containers is positioned at the main conveyor member 10. The first and second movable gripping arrangements 11, 13 are placed at the main conveyor member 10 and the welding unit 12, respectively, with their gripping elements 11a, 11b, 13a, 13b separated and about to be pushed together as indicated by the arrows as to grip around the containers 2.

Figure 4B:
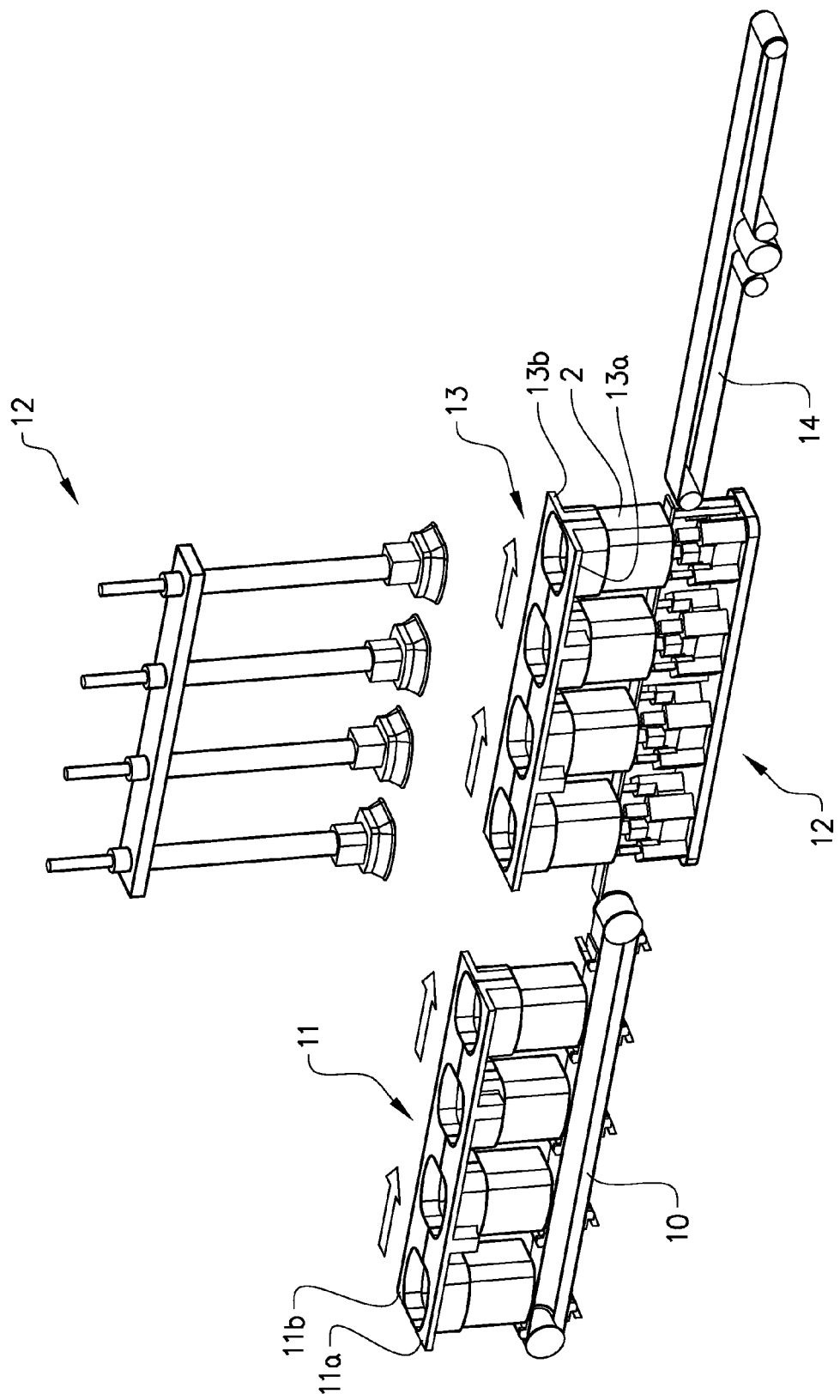

In FIG. 4B the first and second movable gripping arrangements 11, 13 have gripped each of the containers 2 and are now about to move the containers 2 simultaneously in the transport direction of the apparatus 1 indicated by the arrows. The movements of the first and second movable gripping arrangements 11, 13 are not synchronized which, for instance, means that the first gripping arrangement 11 is allowed to move along the main conveyor member 10 at a corresponding transport speed while gripping (and lifting) the containers 2. Thus, the main conveyor member 10 does not have to stop during the gripping process and can thus be operated continuously.

Figure 4C:
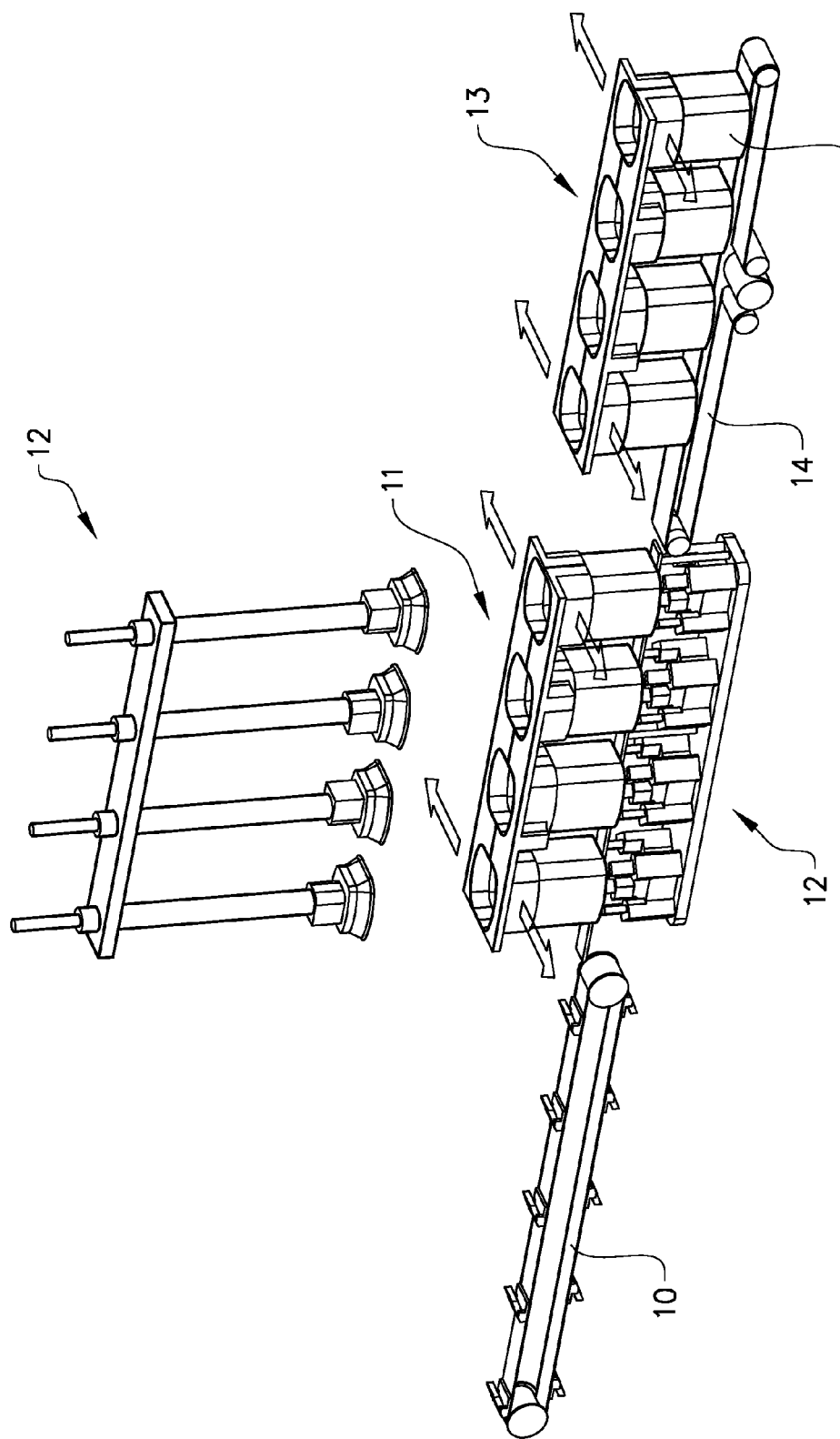

In FIG. 4C the first and second movable gripping arrangements 11, 13 and their corresponding sets of containers 2 have moved to the welding unit 12 and the outlet conveyor member 14, respectively. The gripping elements 11a, 11b, 13a, 13b can now be separated as indicated by the arrows leaving the containers 2 where they are.

Figure 4D:
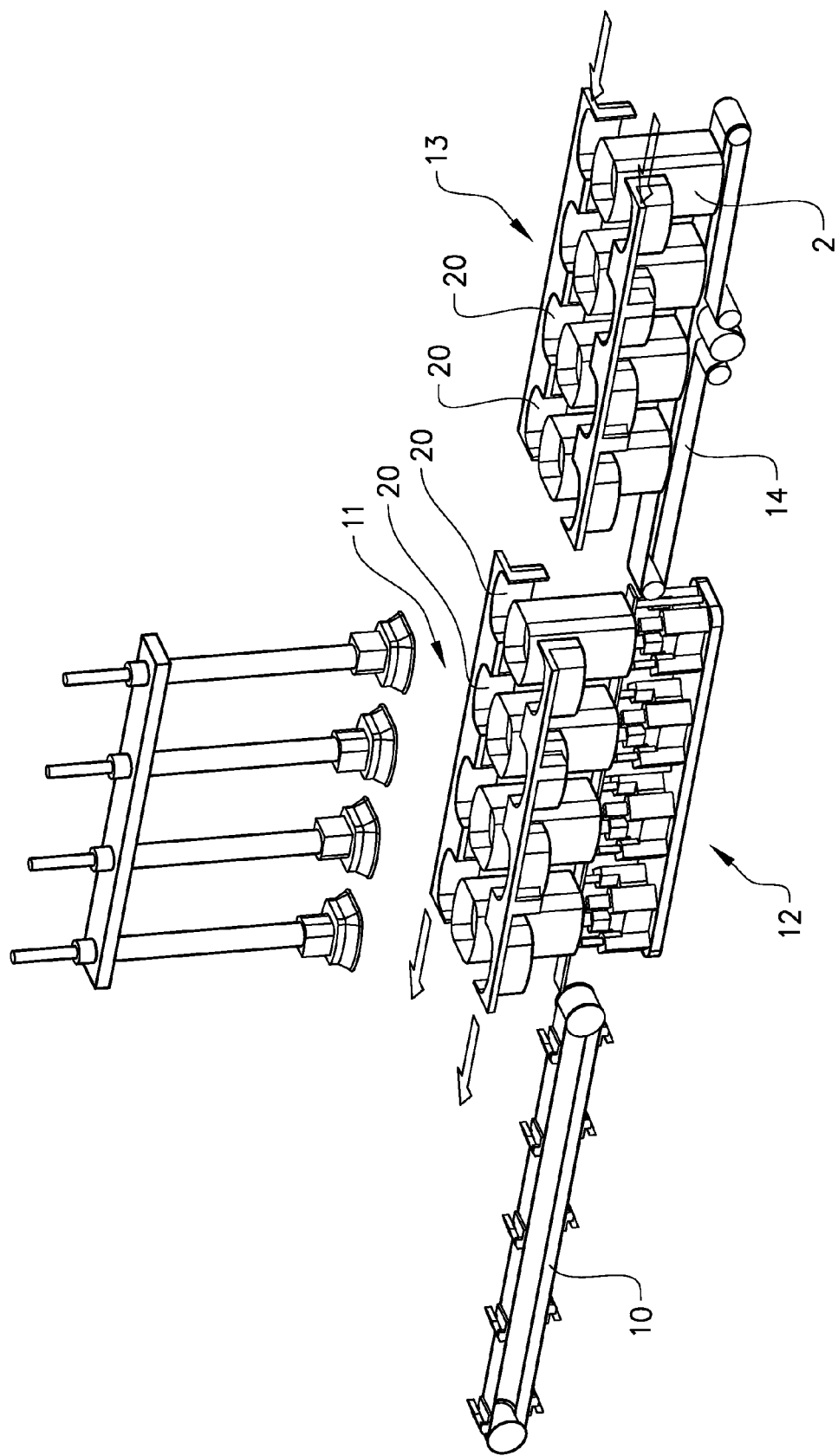

FIG. 4D shows the first and second movable gripping arrangements 11, 13 in the separated position. Arrows indicate that the gripping arrangements 11, 13 are about to move back to the position shown in FIG. 4A at which point a new set of containers are positioned at the main conveyor member 10.

FIGS. 5A-5E show the function of the welding unit 12 that comprises four subunits arranged in a row along the main transport direction of the apparatus 1. Each subunit comprises a cavity 21 adapted to receive an upper part of the container 2 where the lid 17 is to be fastened. The inductive welding energy generator, in this example a coil 25 (see FIGS. 5A and 5E), extends around the cavity 21 such as to circumferentially surround a container 2 placed in the cavity 21 along a distance corresponding to a side edge of a lid 17 placed in its intended fastening position in the container 2. Each subunit further comprising a lid positioning device 22 configured to position a lid 17 in the intended fastening position inside the container 2, i.e. in a position in level with the coil 25.

The lid positioning device 22 is vertically adjustable and capable of pressing down a lid 17 into the container 2 to the desired welding position. The lid positioning device 22 is further expandable in a radial direction of the cavity 21 such as to press a folded edge of a lid 17 circumferentially towards the coil 25, i.e. towards an inside of the wall of a container 2 placed in the cavity 21 along a line levelled with the coil 25.

The welding unit 12 further comprises a container supporting and positioning device 23 configured to position each of the containers 2 in its corresponding cavity 21 by lifting the container 2 to a desired position.

The welding unit 12 further comprises a lid supplier 24 comprising a stationary but rotationally suspended first rod 30 and suction grippers 28 arranged on a rotationally suspended second rod 29, said first and second rods 30, 29 being substantially parallel and connected via connecting rods 31. The welding unit 12 also comprises a lid transfer plate 26 provided with four lid cavities 27. The lid supplier 24 is configured to transfer lids 17 from the lid supply unit 7 to the transfer plate 26 and simultaneously place a lid 17 in each of the lid cavities 27. This is done by gripping lids 17 at the lid supply unit 7, rotating the first rod 30 as to transfer the gripped lids 17 towards the transfer plate 26, rotating the second rod 29 as to rotationally direct the lids 17 properly towards the lid cavities 27.

The lid transfer plate 26 is transversally moveable between a first position at a side of the row of welding subunits, in which position the lids 17 are placed in the lid cavities 27, and a second position in line with the welding subunits, below the lid positioning devices 22 and above the container cavities 21. In this second position the lids are aligned with the lid positioning devices 22 and the container cavities 21 so that the lids 17 can be pushed down through the lid cavities 27 into their corresponding container 2 placed in the container cavity 21.

Figure 5A:
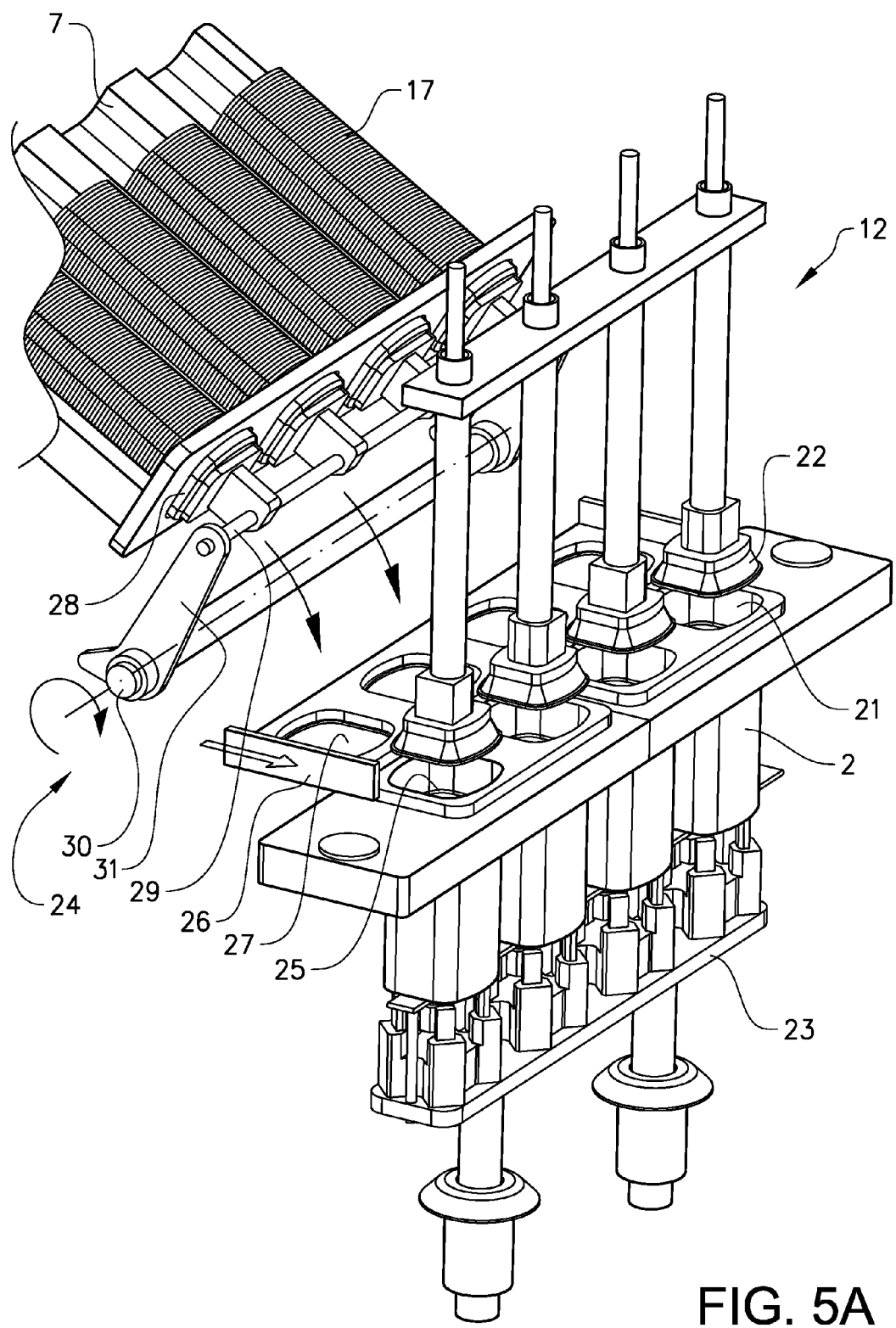

In FIG. 5A solid arrows indicate that the lid supplier 24 is about to transfer lids 17 to the transfer plate 26 which is in its first position. Another arrow indicates the direction towards the second position of the transfer plate 26. The container supporting and positioning device 23 is in a lower position. The lid positioning device 22 is in an upper position.

Figure 5B:
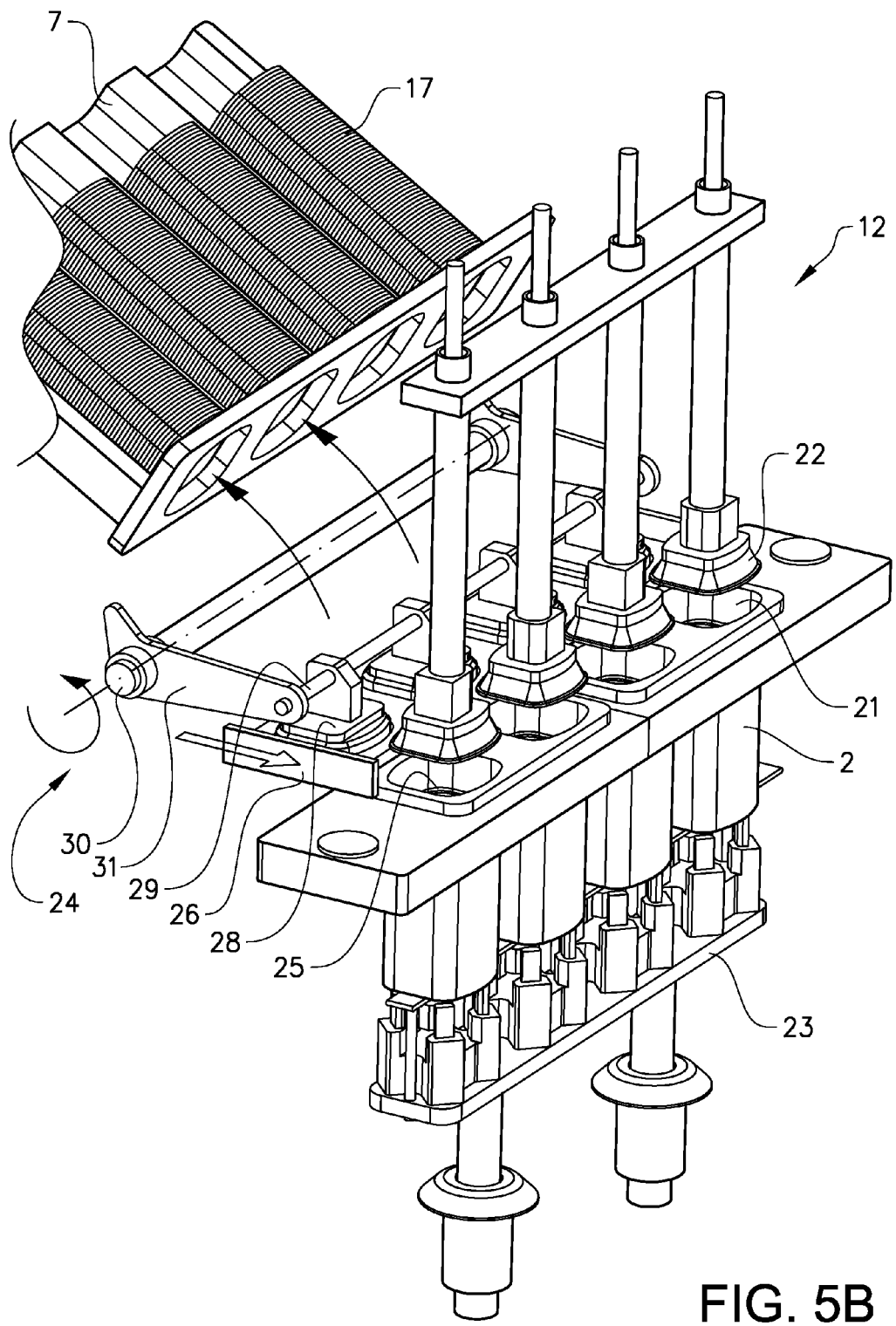

In FIG. 5B the lids 17 have been transferred to the transfer plate 26 and positioned in their corresponding lid cavities 27 by rotating the lid supplier around the first rod 30. During this rotation also the second rod 29 rotates.

Figure 5C:
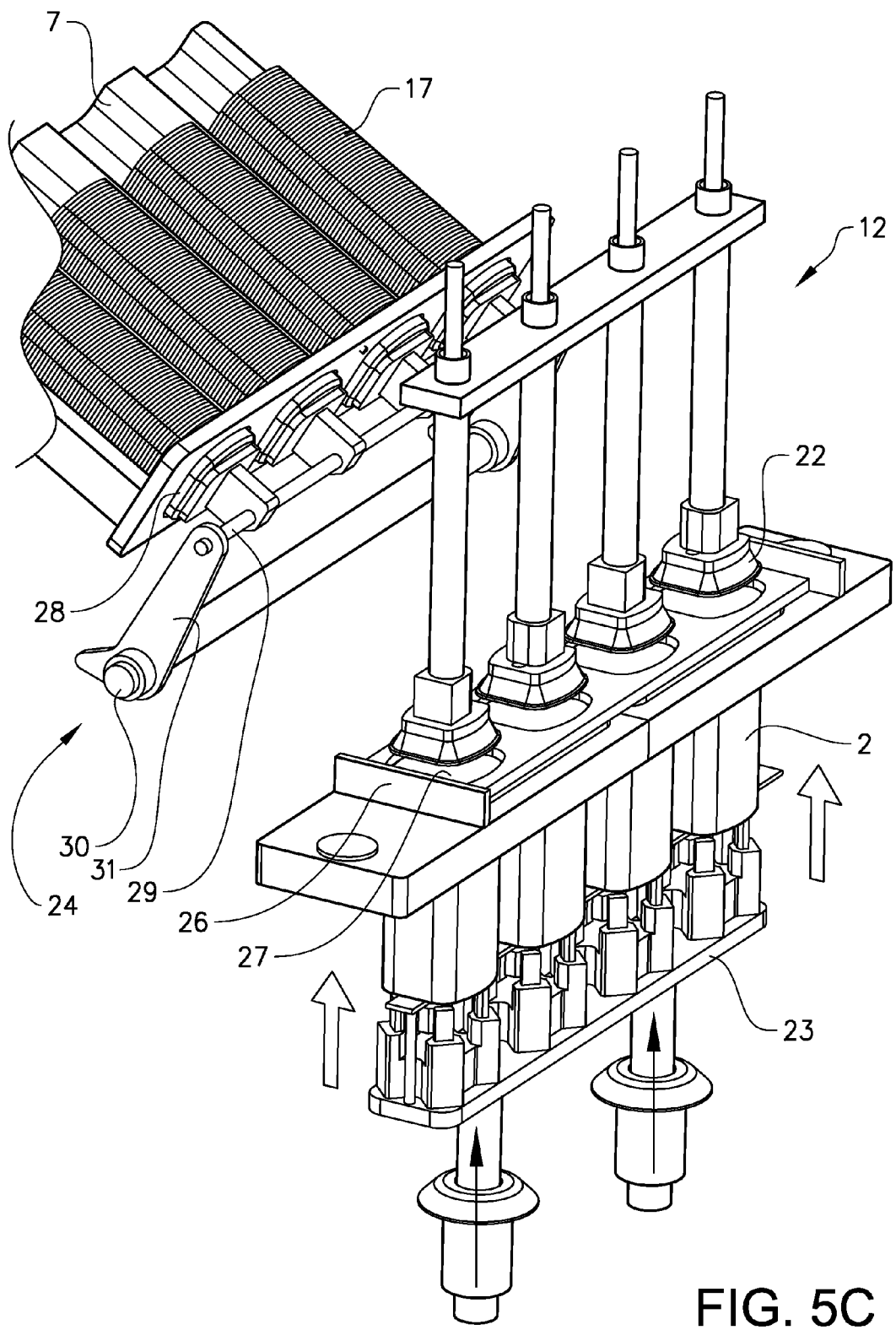

In FIG. 5C the transfer plate 26 has moved to its second position, Arrows indicate that the container supporting and positioning device 23 has started to move towards an upper position as to position the containers 2 in the container cavities 21.

Figure 5D:
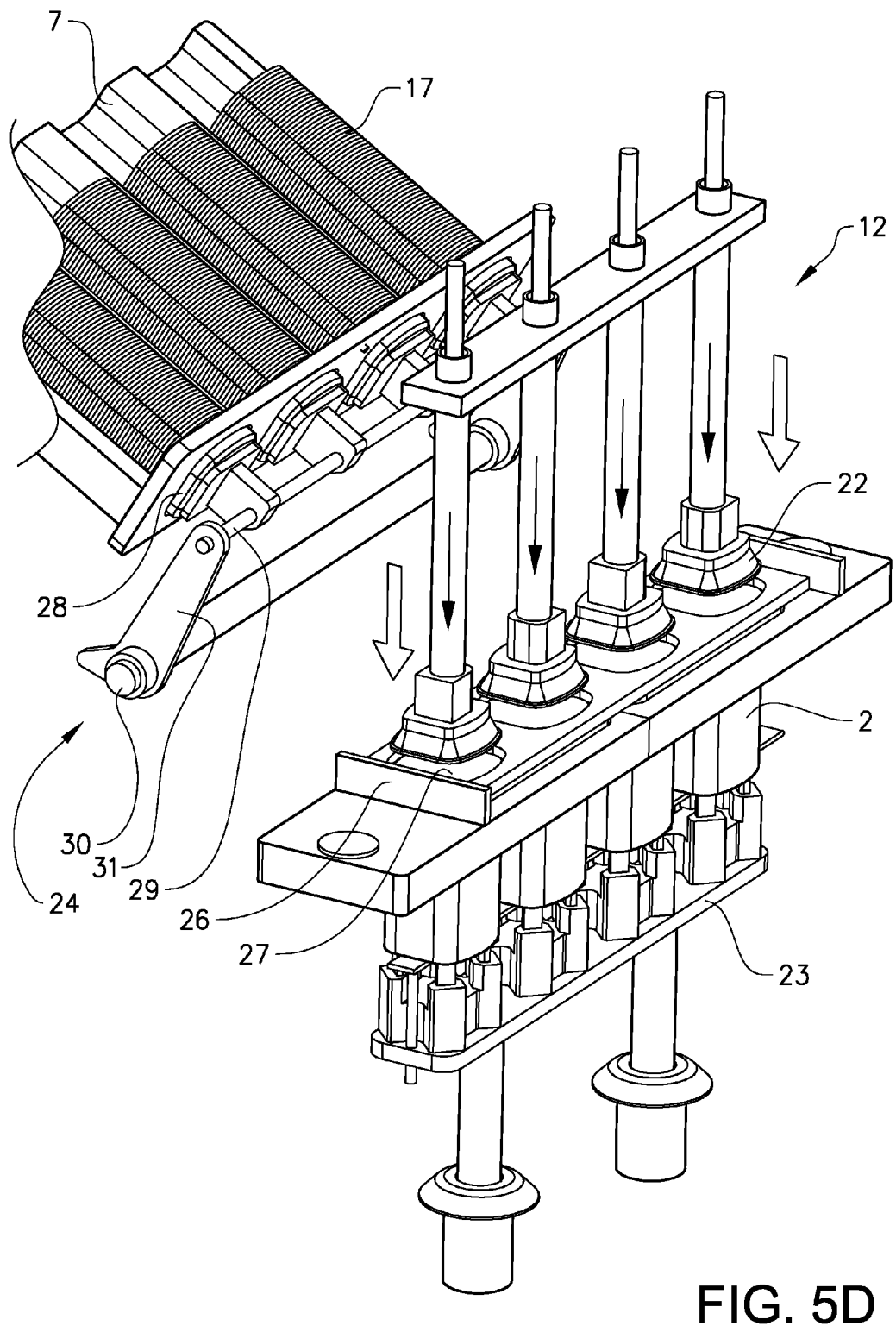

In FIG. 5D the container supporting and positioning device 23 has reached its upper position and the containers 2 are now properly positioned in the container cavities 21. Arrows indicate that the lid positioning device 22 is about to be moved to a lower position.

Figure 5E:
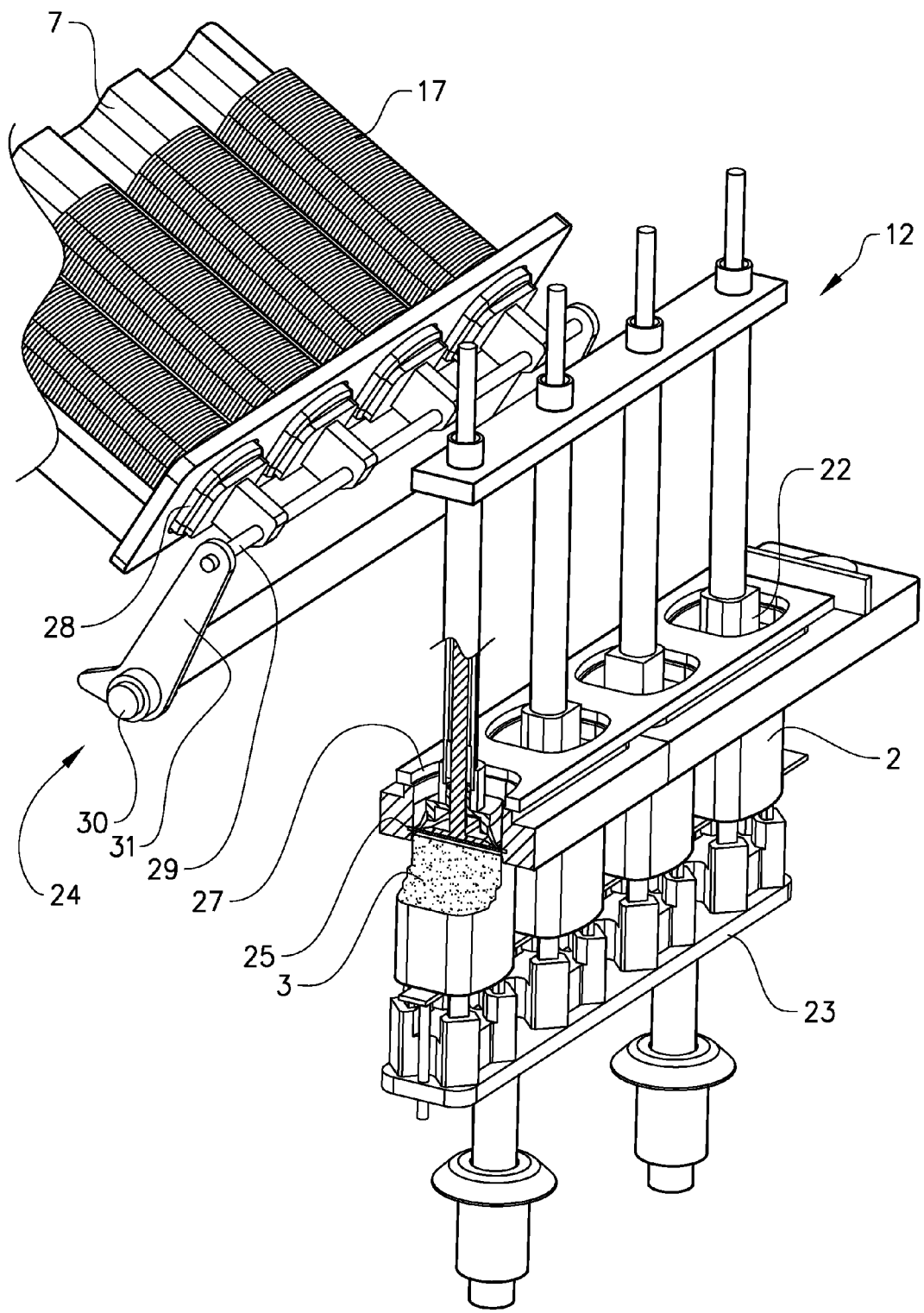

In FIG. 5E the lid positioning device 22 has reached its lower position and the lid 17 has now been pressed down through the lid cavity 27, which comprises a flange that supports the lid 17 and that provides the lid 17 with a folded edged when the lid 17 is pressed through the lid cavity 27, and further down into the container 2 to the desired welding position above the powder 3 in the container 2. At this stage the lid positioning device 22 expands in a radial direction of the cavity 21 and presses the folded edge of the lid 17 towards the inside of the wall of the container 2 and further towards the circumferentially arranged coil 25. By supplying current to the coil 25 heat is inductively generated in electrically conductive layers in the lid 17 and the container 2 in positions sufficiently close to the coil 25. The heat melts weldable layers of the lid 17 and the container 2, and the expansion of the lid positioning device 22 provides for a pressure that provides for a tight contact between the lid 17 and the container 2. The pressure is maintained for a short time period after the coil current has been turned off so that the weldable layer gets sufficient time to cool and harden.

When the welding process is completed the lid positioning device 22 is moved to its upper position, the transfer plate 26 is moved to its first position and the container supporting and positioning device 23 is moved to its lower position. The sealed containers 2 can now be moved and be replaced with unsealed containers 2 by means of the first and second movable gripping arrangements 11, 13.

Figure 6:
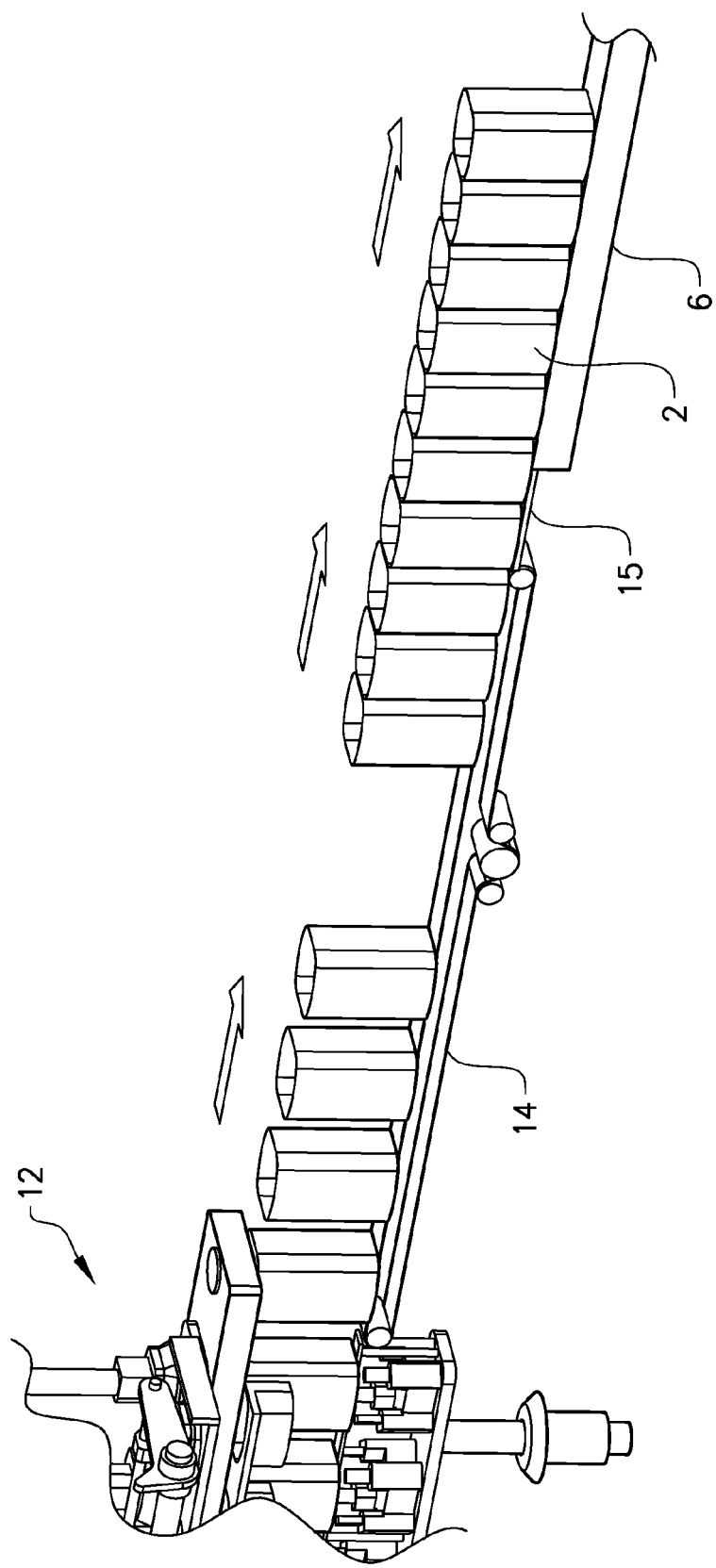
FIG. 6 shows a part of the welding unit, a further, outlet conveyor member and a stationary sliding plate of the apparatus shown in FIG. 1.

FIG. 6 shows a part of the welding unit 12, the further, outlet conveyor member 14, the stationary sliding plate 15 and an external conveyor 6 that feeds containers 2 away from the apparatus 1. As mentioned above, the second moveable gripping arrangement 13 grips the four containers 2 provided with lids 17 and transfers these containers 2 simultaneously from the welding unit 12 to the further conveyor member 14. When transferred to, and left at, the further conveyor member 14, the containers 2 are separated from each other in the transport direction as described above.

The sliding plate 15 is arranged downstream of the further, outlet conveyor member 14 such that the containers 2 are transferred to the sliding plate 15 from the further conveyor member 14. The sliding plate 15 is arranged in a tunnel 35 (see FIG. 7) and forms a bridge between the further conveyor member 14 and the external conveyor 6. A container 2 that reaches the sliding plate 15 stops until it is pushed forward by containers behind. This means that the distance between the containers 2 is removed at the sliding plate 15 and that the flow of containers (again) will form a row of closely packed containers 2 (see FIG. 6). This also means that at least one container 2 always will be positioned on the sliding plate 15. For instance, if the apparatus 15 stops a first container will remain on the sliding plate 15 until a second container comes from behind and pushes the first container away when the apparatus starts again.

Figure 7:
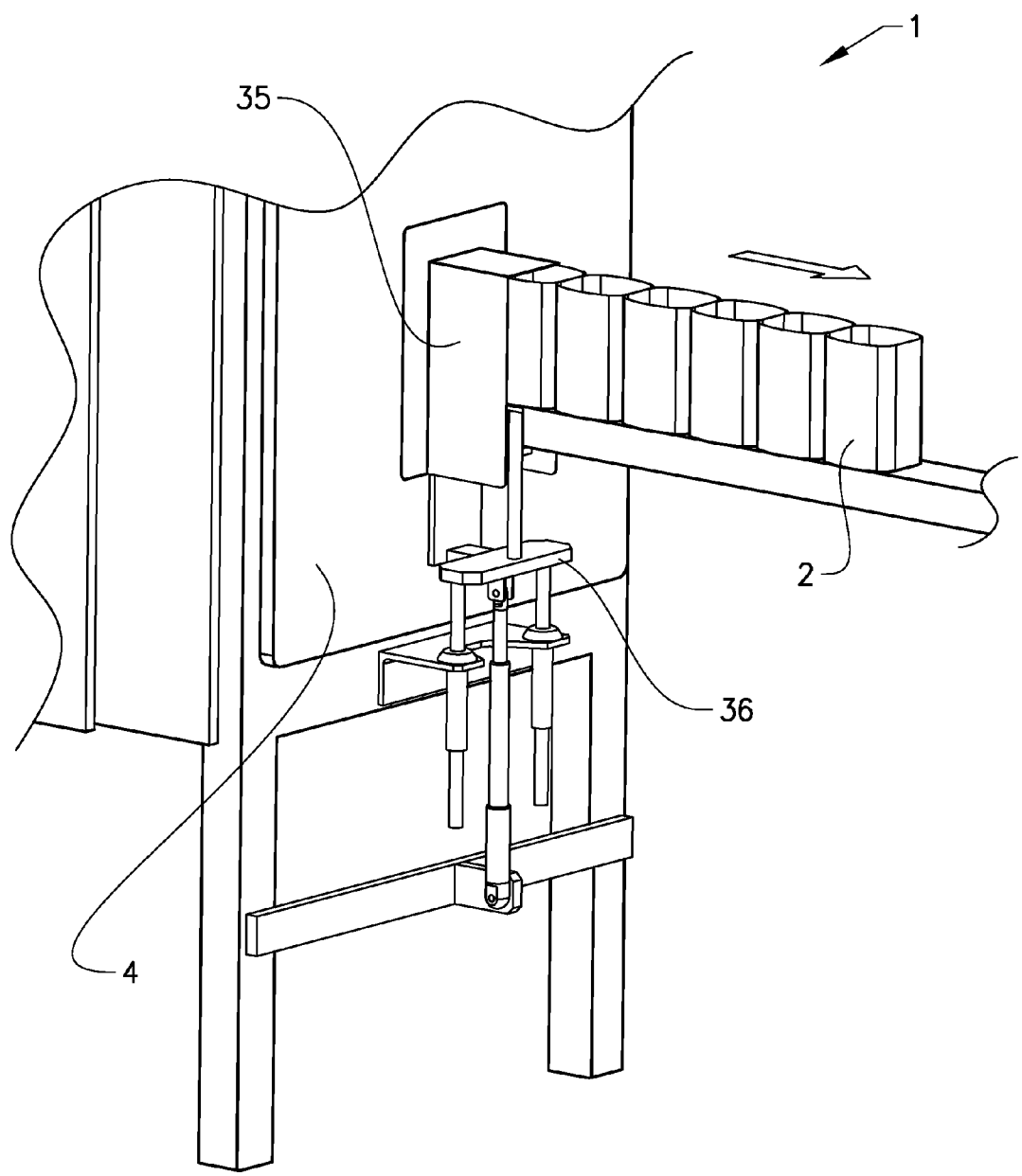
FIG. 7 shows an outlet of the apparatus shown in FIG. 1.

FIG. 7 shows an outlet of the apparatus 1 where the external conveyor 6, some containers 2, the tunnel 35, the cover 4, and a supporting arrangement 36 for the external conveyor 6 can be seen. The supporting arrangement 36 is height adjustable in order to allow adjustment of the vertical position of the external conveyor 6. The apparatus 1 is arranged in such a way that it can be adapted to containers with different height by lowering or raising relevant parts, such as the further conveyor member 14 and the sliding plate 15.

The tunnel 35 forms a container outlet opening in the housing 4 downstream of the sliding plate. The size of the tunnel 35 is adapted to the size of the containers used. Since at least one container 2 always will be positioned on the sliding plate 15 in the tunnel 35 (see above), air is prevented from entering the apparatus 1 inside the housing 4. Even when the apparatus 1 stops the tunnel 35 will be plugged by a container 2. This way the sealing process can be carried out under an atmosphere of protection gas, which is important for many types of container contents, for instance oxygen sensitive powder, such as food powder. When operating the apparatus 1 under an atmosphere of protection gas the external conveyor 5 for feeding containers 2 to the apparatus 1 is placed in another tunnel. Such a tunnel can easily be mounted to the housing 4 at the inlet side of the apparatus 1.

The moving parts of the apparatus, such as the feed screw members 9a, 9b, the main conveyor member 10 and the movable gripping arrangements 11, 13, are driven by servo-motors (pilot motors) controlled by a control unit.

Typically, both the container 2 and the lid 17 forms a multilayer structure comprising a supporting, outer cardboard layer and a weldable, inner layer with a layer of aluminium arranged in between for providing a sufficiently tight container/lid and to allow inductive heating. However, the inductively heated layer can be the same layer as the weldable layer. For instance, the weldable can be an electrically conductive plastic layer.

The invention is not limited by the embodiments described above but can be modified in various ways within the scope of the claims. For instance, it is possible to make use of only one feed screw member and a guiding plate. However, two cooperatively operating feed screw members provides for a more secure transportation.

Moreover, the number of simultaneously handled containers can be other than four.

The invention claimed is:

1. An apparatus for sealing an open end of a cardboard-based container containing a powder, wherein the apparatus comprises:
   a welding unit configured to fasten a lid to the container, said welding unit comprising an inductive welding energy generator for melting of a wieldable layer that forms part of the container and/or the lid; and
   a transporter configured to transport a flow of containers to and from the welding unit,
   wherein the transporter comprises, in a container flow order, a feeding arrangement, a main conveyor member and a movable gripping arrangement, wherein the feeding arrangement is configured to transfer containers one by one in a continuous manner to the main conveyor member, wherein the movable gripping arrangement is configured to transfer containers from the main conveyor member to the welding unit, and wherein the apparatus is arranged in such a way that, during normal operation of the apparatus, the containers line up close to each other at an upstream side of the feeding arrangement,
   wherein the feeding arrangement is configured to, during operation, separate adjacent containers from each other in the direction of transport by increasing the feeding speed of each individual container along the feeding arrangement and thereby increasing the distance between adjacent containers fed along the feeding arrangement,
   wherein the main conveyor member is configured to operate at a transport speed that approximately corresponds to, and is uniform in relation to, a discharge speed of the containers when fed out from the feeding arrangement such that containers transferred to and along the main conveyor member remain separated,
   wherein the moveable gripping arrangement is configured to grip at least two containers and transfer these containers simultaneously from the main conveyor member to the welding unit, and
   wherein the welding unit is configured to simultaneously fasten a lid to each of the simultaneously transferred containers.

2. The apparatus according to claim 1, wherein the feeding arrangement comprises a feed screw member provided with an increasing pitch such that the feeding speed of each individual container as well as the distance between adjacent containers increase in correspondence with the increasing pitch when containers are transported by the feed screw member.

3. The apparatus according to claim 2, wherein the feed screw arrangement comprises two feed screw members arranged in parallel along each side of the flow of containers such that each container is transported between the two feed screw members that are arranged to operate in cooperation with each other.

4. Apparatus according to claim 2, wherein the main conveyor member comprises slide guides and carrier bars, wherein the slide guides are configured to support the containers when transferred to the main conveyor member and allow them to slide in the transport direction and wherein the carrier bars are distributed at defined distances from each other along a moving and conveying part of the main conveyor member such as to push the containers along the slide guides.

5. The apparatus according to claim 2, wherein the transporter comprises an inlet conveyor member configured to feed containers to the feeding arrangement, wherein the inlet conveyor member is configured to operate at a transport speed that approximately corresponds to, and is uniform in relation to, an initial feeding speed at an inlet side of the feeding arrangement.

6. The apparatus according to claim 2, wherein the welding unit comprises at least two subunits, each subunit comprising a cavity adapted to receive at least an upper part of the container where the lid is to be fastened, wherein the inductive welding energy generator extends around the cavity such as to circumferentially surround a container placed in the cavity along a distance corresponding to a side edge of a lid placed in its intended fastening position in the container, each subunit further comprising a lid positioning device configured to position a lid in the intended fastening position.

7. The apparatus according to claim 2, wherein the moveable gripping arrangement comprises a first and a second gripping element arranged to operate on opposite sides of the flow of containers, wherein the gripping elements are moveable towards and away from each other for gripping and releasing the containers, respectively, and wherein the gripping elements, in a synchronized manner, are movable along the flow of containers between the main conveyor member and the welding unit for the simultaneous transfer of containers, each gripping element being provided with at least two recesses for gripping on each side of a corresponding number of simultaneously gripped containers, wherein the distance between the recesses of each gripping element corresponds to the distance between containers positioned on the main conveyor member during operation of the apparatus.

8. The apparatus according to claim 2, wherein the transporter comprises a second moveable gripping arrangement and a further, outlet conveyor member arranged downstream of the welding unit, wherein the second moveable gripping arrangement is configured to grip the at least two containers and transfer these containers simultaneously from the welding unit to the further conveyor member.

9. The apparatus according to claim 2, wherein a housing is arranged to surround the apparatus such as to allow sealing to take place in a protection gas atmosphere.

10. The apparatus according to claim 9, wherein a container outlet opening is arranged in the housing downstream of a sliding plate, wherein a size of the opening is adapted to a size of the containers used.

11. The apparatus according to claim 1,
wherein the main conveyor member comprises slide guides and carrier bars, wherein the slide guides are configured to support the containers when transferred to the main conveyor member and allow them to slide in the transport direction and wherein the carrier bars are distributed at defined distances from each other along a moving and conveying part of the main conveyor member such as to push the containers along the slide guides.

12. The apparatus according to claim 1,
wherein the transporter comprises an inlet conveyor member configured to feed containers to the feeding arrangement, wherein the inlet conveyor member is configured to operate at a transport speed that approximately corresponds to, and is uniform in relation to, an initial feeding speed at an inlet side of the feeding arrangement.

13. The apparatus according to claim to 1,
wherein the welding unit comprises at least two subunits, each subunit comprising a cavity adapted to receive at least an upper part of the container where the lid is to be fastened, wherein the inductive welding energy generator extends around the cavity such as to circumferentially surround a container placed in the cavity along a distance corresponding to a side edge of a lid placed in its intended fastening position in the container, each subunit further comprising a lid positioning device configured to position a lid in the intended fastening position.

14. The apparatus according to claim to 1,
wherein the moveable gripping arrangement comprises a first and a second gripping element arranged to operate on opposite sides of the flow of containers,
wherein the gripping elements are moveable towards and away from each other for gripping and releasing the containers, respectively, and wherein the gripping elements, in a synchronized manner, are movable along the flow of containers between the main conveyor member and the welding unit for the simultaneous transfer of containers, each gripping element being provided with at least two recesses for gripping on each side of a corresponding number of simultaneously gripped containers, wherein the distance between the recesses of each gripping element corresponds to the distance between containers positioned on the main conveyor member during operation of the apparatus.

15. The apparatus according to claim to 1,
wherein the transporter comprises a second moveable gripping arrangement and a further, outlet conveyor member arranged downstream of the welding unit, wherein the second moveable gripping arrangement is configured to grip the at least two containers and transfer these containers simultaneously from the welding unit to the further conveyor member.

16. The apparatus according to claim 8,
wherein a stationary sliding plate is arranged downstream of the further, outlet conveyor member such that the containers are transferred to the sliding plate from the further conveyor member.

17. The apparatus according to claim 1,
wherein a housing is arranged to surround the apparatus such as to allow sealing to take place in a protection gas atmosphere.

18. The apparatus according to claim 17,
wherein a container outlet opening is arranged in the housing downstream of a sliding plate, wherein a size of the opening is adapted to a size of the containers used.

19. The apparatus according claim to 1,
wherein the movable gripping arrangement is configured to grip four containers and transfer these four containers simultaneously from the main conveyor member to the welding unit, wherein the welding unit is configured to simultaneously fasten a gas-tight lid to each of the four containers.

20. A method for sealing an open end of a cardboard-based container containing a powder, comprising the steps of:
fastening, in a welding unit, a lid to the container using an inductive welding energy generator for melting of a weldable layer that forms part of the container and/or the lid;
transporting a flow of containers to and from the welding unit,
wherein the method further comprises the steps of:
transferring containers one by one in a continuous manner from a feeding arrangement to a main conveyor member,
transferring containers from the main conveyor member to the welding unit via a movable gripping arrangement
separating adjacent containers from each other in the direction of transport by increasing the feeding speed of each individual container along the feeding arrangement and thereby increasing the distance between adjacent containers fed along the feeding arrangement,
operating the main conveyor member at a transport speed that approximately corresponds to, and is uniform in relation to, a discharge speed of the containers when fed out from the feeding arrangement such that containers transferred to and along the main conveyor member remain separated,
gripping, via the moveable gripping arrangement, at least two containers and transferring these containers simultaneously from the main conveyor member to the welding unit, and
fastening simultaneously a lid to each of the simultaneously transferred containers.

* * * * *

UNITED STATES PATENT AND TRADEMARK OFFICE
CERTIFICATE OF CORRECTION

PATENT NO. : 9,546,009 B2  
APPLICATION NO. : 14/232166  
DATED : January 17, 2017  
INVENTOR(S) : Per Hagelqvist et al.

Page 1 of 1

It is certified that error appears in the above-identified patent and that said Letters Patent is hereby corrected as shown below:

In the Claims

In Column 11, Claim 1, Line 41, after "melting of a" replace "wieldable" with --weldable--.

In Column 13, Claim 13, Line 31, after "according to" replace "claim to 1," with --claim 1,--.

In Column 13, Claim 14, Line 43, after "according to" replace "claim to 1," with --claim 1,--.

In Column 13, Claim 15, Line 60, after "according to" replace "claim to 1," with --claim 1,--.

In Column 14, Claim 19, Line 20, after "apparatus according" replace "claim to 1," with --to claim 1,--.

Signed and Sealed this  
Seventeenth Day of April, 2018

Andrei Iancu  
*Director of the United States Patent and Trademark Office*